United States Patent
Huang

(10) Patent No.: US 12,033,319 B2
(45) Date of Patent: Jul. 9, 2024

(54) SCALP MONITORING METHOD, SMART HAIR DRYER AND READABLE STORAGE MEDIUM

(71) Applicant: HON HAI PRECISION INDUSTRY CO., LTD., New Taipei (TW)

(72) Inventor: Yen-Jen Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 585 days.

(21) Appl. No.: 17/335,364

(22) Filed: Jun. 1, 2021

(65) Prior Publication Data
US 2021/0378379 A1    Dec. 9, 2021

(30) Foreign Application Priority Data

Jun. 3, 2020    (CN) .......................... 202010495928.7

(51) Int. Cl.
*G06T 7/00* (2017.01)
*G06T 7/90* (2017.01)
*A45D 20/12* (2006.01)
*A45D 44/00* (2006.01)

(52) U.S. Cl.
CPC .............. *G06T 7/0012* (2013.01); *G06T 7/90* (2017.01); *A45D 20/12* (2013.01); *A45D 44/005* (2013.01); *A45D 2044/007* (2013.01)

(58) Field of Classification Search
CPC ......... G06T 7/0012; G06T 7/90; A45D 20/12; A45D 44/005; A45D 2044/007
USPC ........................................................ 382/128
See application file for complete search history.

(56) References Cited

U.S. PATENT DOCUMENTS 11,813,074 B2 * 11/2023 Katzarov ............. A61B 5/0059
2017/0164887 A1 * 6/2017 Chattopadhyay .... A42B 3/0433

FOREIGN PATENT DOCUMENTS

| CN | 108041790 A | 5/2018 | |
|----|-------------|--------|---|
| CN | 109512384 A | 3/2019 | |
| TW | 201701821 A | 1/2017 | |
| WO | WO-2019228085 A1 * | 12/2019 | ........... F24H 15/128 |

* cited by examiner

*Primary Examiner* — Gabriel I Garcia
(74) *Attorney, Agent, or Firm* — ScienBiziP, P.C.

(57) ABSTRACT

A scalp monitoring method applied to a smart hair dryer is provided. The method includes obtaining a plurality of head photos by photographing a head of a user using a photographing device. A head region corresponding to each of the plurality of head photos is identified. Once related parameters of each head region is identified based on the head photos corresponding to the each head region, a condition of a scalp of the each head region is analyzed based on the related parameters of the each head region and historical related parameters corresponding to the each head region.

17 Claims, 3 Drawing Sheets

SCALP MONITORING METHOD, SMART HAIR DRYER AND READABLE STORAGE MEDIUM

FIELD

The present disclosure relates to image processing technology, in particular to a scalp monitoring method, a smart hair dryer, and a readable storage medium.

BACKGROUND

People often use a mirror to apply makeup, but people rarely observe a condition of scalp through a mirror. Should there be any medical conditions with the scalp, such as scalp rash, early detection is beneficial to quick treatment and recovery.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
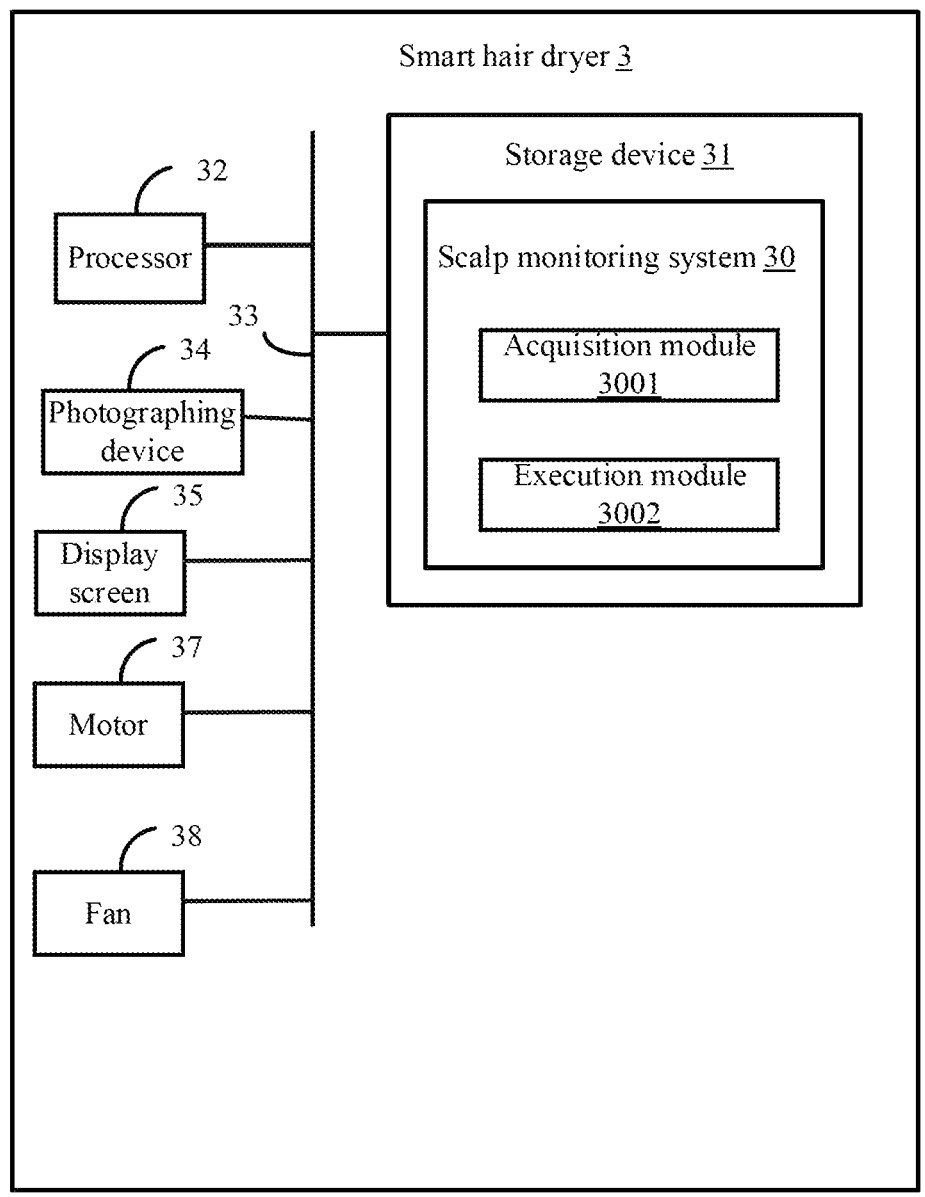
FIG. 1 illustrates a schematic diagram of an operating environment of a scalp monitoring system provided by a preferred embodiment of the present disclosure.

FIG. 1 illustrates a schematic diagram of an operating environment of a scalp monitoring system provided by a preferred embodiment of the present disclosure.

In at least one embodiment, a scalp monitoring system 30 is running in a smart hair dryer 3. The smart hair dryer 3 includes, but is not limited to, a storage device 31, at least one processor 32, at least one communication bus 33, a photographing device 34, a display screen 35, a motor 37, and a fan 38.

Figure 2:
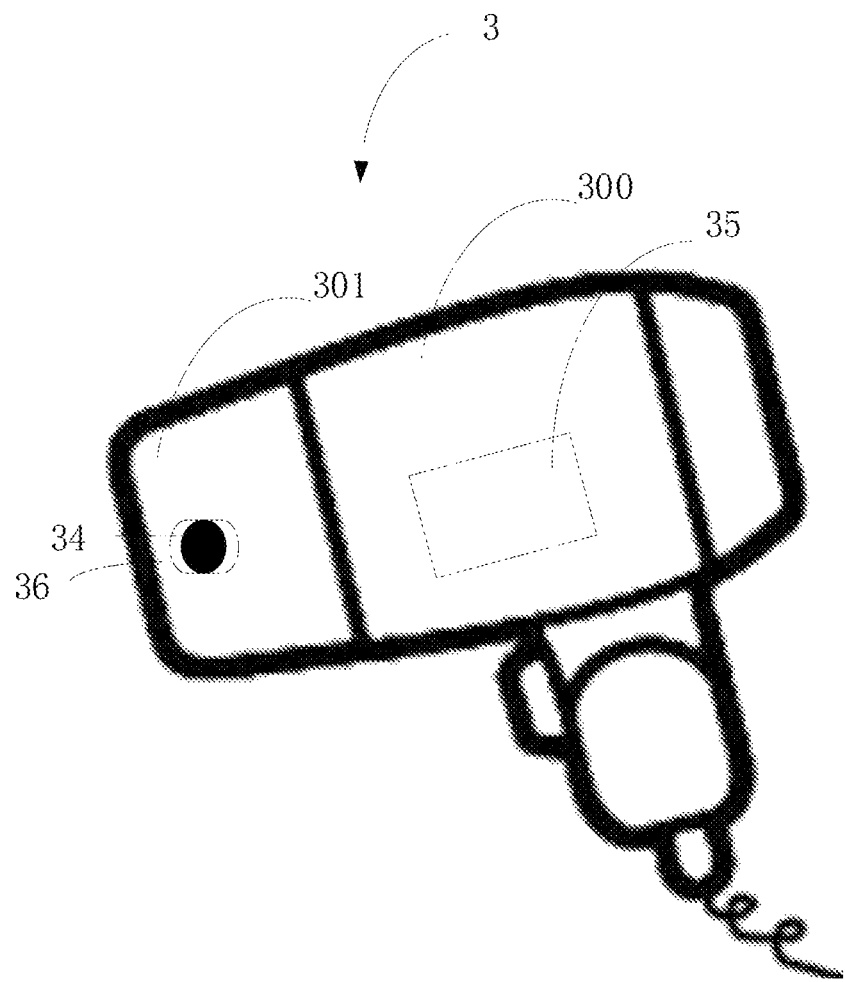
FIG. 2 illustrates a position of a photographing device installed on a smart hair dryer.

As shown in FIG. 2, the photographing device 34 can be installed on a housing 300 of the smart hair dryer 3.

In one embodiment, the photographing device 34 is set at a position where an air nozzle 301 on the housing 300 of the smart hair dryer 3 is located.

In one embodiment, the photographing device 34 may be set on a three-axis stabilizer 36 to reduce blurring caused by shaking when the photographing device 34 moves along with the smart hair dryer 3 to photograph a head of a user.

In one embodiment, the three-axis stabilizer 36 is housed in the housing 300 of the smart hair dryer 3 or is exposed on the housing 300 of the smart hair dryer 3.

The photographing device 34 includes an optical lens and a CMOS (Complementary Metal Oxide Semiconductor, complementary metal oxide semiconductor) photosensitive element.

The display screen 35 may be a touch display screen or a non-touch display screen.

Those skilled in the art should understand that the structure of the smart hair dryer 3 shown in FIG. 1 and FIG. 2 does not constitute a limitation of the embodiment of the present disclosure. The smart hair dryer 3 can further include more or less other hardware or software than that shown in FIG. 1, or the smart hair dryer 3 can have different component arrangements.

It should be noted that the smart hair dryer 3 is merely an example. If another kind of smart hair dryer can be adapted to the present disclosure, it should also be included in the protection scope of the present disclosure, and incorporated herein by reference In some embodiments, the storage device 31 may be used to store program codes and various data of computer programs. For example, the storage device 31 may be used to store the scalp monitoring system 30 installed in the smart hair dryer 3 and implement completion of storing programs or data during an operation of the smart hair dryer 3. The storage device 31 may include Read-Only Memory (ROM), Programmable Read-Only Memory (PROM), and Erasable Programmable Read-Only Memory. EPROM), One-time Programmable Read-Only Memory (OTPROM), Electronically-Erasable Programmable Read-Only Memory (EEPROM), Compact Disc (Compact Disc) Read-Only Memory (CD-ROM) or other optical disk storage, disk storage, magnetic tape storage, or any other non-transitory computer-readable storage medium that can be used to carry or store data.

In some embodiments, the at least one processor 32 may be composed of an integrated circuit. For example, the at least one processor 32 can be composed of a single packaged integrated circuit or can be composed of multiple packaged integrated circuits with the same function or different function. The at least one processor 32 includes one or more central processing units (CPUs), one or more microprocessors, one or more digital processing chips, one or more graphics processors, and various control chips. The at least one processor 32 is a control unit of the smart hair dryer 3. The at least one processor 32 uses various interfaces and lines to connect various components of the smart hair dryer 3, and executes programs or modules or instructions stored in the storage device 31, and invokes data stored in the storage device 31 to perform various functions of the smart hair dryer 3 and to process data, for example, perform a function of monitoring scalp (for details, see the description of FIG. 3).

In some embodiments, the at least one communication bus 33 is used to implement communication connection between the storage device 31 and the at least one processor 32 and other elements of the smart hair dryer 3.

In this embodiment, the scalp monitoring system 30 can include one or more modules. The one or more modules are stored in the storage device 31 and are executed by at least one processor (e.g. processor 32 in this embodiment), such that a function of monitoring scalp (for details, see the introduction to FIG. 3 below) is achieved.

In this embodiment, the scalp monitoring system 30 can include a plurality of modules. Referring to FIG. 1, the plurality of modules includes an acquisition module 3001 and an execution module 3002. The module referred to in the present disclosure refers to a series of computer-readable instructions that can be executed by at least one processor (for example, the processor 32), and can complete functions, and can be stored in a storage device (for example, the storage device 31 of the smart hair dryer 3). In this embodiment, functions of each module will be described in detail with reference to FIG. 3.

Figure 3:
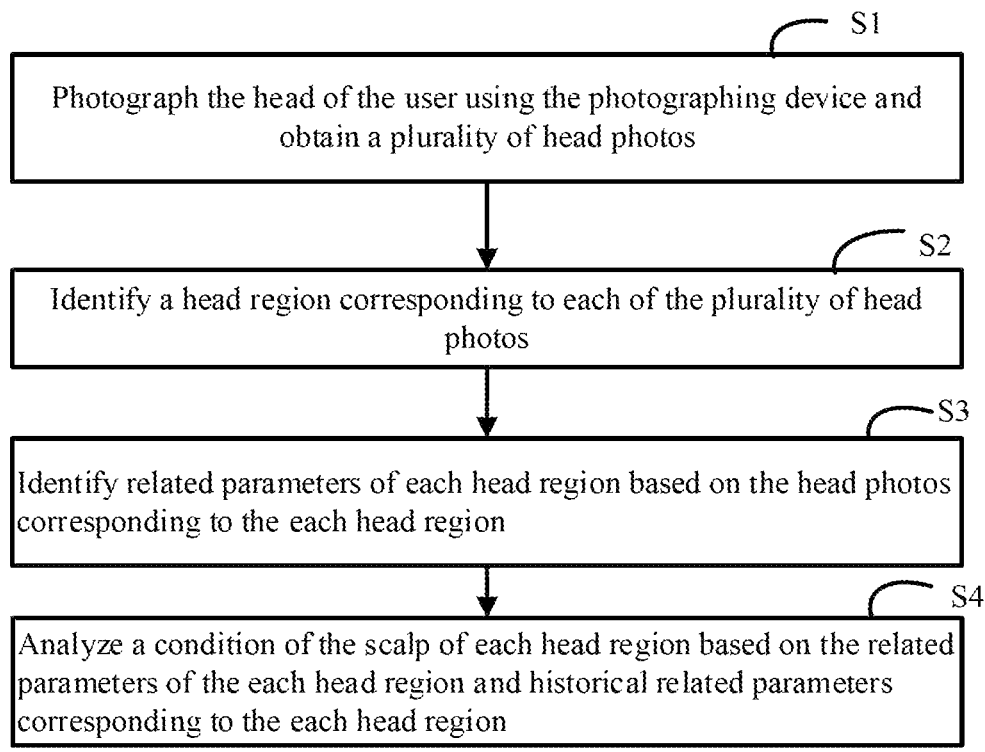
FIG. 3 shows a flow chart of one embodiment of a scalp monitoring method of the present disclosure.

In this embodiment, an integrated unit implemented in a form of a software module can be stored in a non-transitory computer-readable storage medium. The above modules include one or more computer-readable instructions. The smart hair dryer 3 or a processor implements the one or more computer-readable instructions, such that the method for monitoring scalp shown in FIG. 3 is achieved.

In a further embodiment, referring to FIG. 2, the at least one processor 32 can execute an operating system of the smart hair dryer 3, various types of applications (such as the scalp monitoring system 30 described above), program codes, and the like.

In a further embodiment, the storage device 31 stores program codes of a computer program, and the at least one processor 32 can invoke the program codes stored in the storage device 31 to achieve related functions. For example, each module of the scalp monitoring system 30 shown in FIG. 2 is program code stored in the storage device 31. Each module of the scalp monitoring system 30 shown in FIG. 2 is executed by the at least one processor 32, such that the functions of the modules are achieved, and the purpose of monitoring scalp (see the description of FIG. 3 below for details) is achieved.

In one embodiment of the present disclosure, the storage device 31 stores one or more computer-readable instructions, and the one or more computer-readable instructions are executed by the at least one processor 32 to achieve a purpose of monitoring scalp. Specifically, the computer-readable instructions executed by the at least one processor 32 to achieve the purpose of monitoring scalp is described in detail in FIG. 3 below.

It should be noted that, in other embodiments, the scalp monitoring system 30 may also be implemented as an embedded system with a storage device, a processor, and other necessary hardware or software.

FIG. 3 is a flowchart of a scalp monitoring method according to a preferred embodiment of the present disclosure.

In this embodiment, the scalp monitoring method can be applied to the smart hair dryer 3. For the smart hair dryer 3 that requires to monitor scalp, the smart hair dryer 3 can be directly integrated with the function of monitoring scalp. The smart hair dryer 3 can also achieve the function of monitoring scalp by running a Software Development Kit (SDK).

FIG. 3 shows a flow chart of one embodiment of a scalp monitoring method. Referring to FIG. 3, the method is provided by way of example, as there are a variety of ways to carry out the method. The method described below can be carried out using the configurations illustrated in FIG. 1, for example, and various elements of these figures are referenced in explanation of method. Each block shown in FIG. 3 represents one or more processes, methods, or subroutines, carried out in the method. Furthermore, the illustrated order of blocks is illustrative only and the order of the blocks can be changed. Additional blocks can be added or fewer blocks can be utilized without departing from this disclosure. The example method can begin at block S1.

At block S1, the acquisition module 3001 photographs the head of the user using the photographing device 34 and obtains a plurality of head photos.

In one embodiment, the plurality of head photos may include one or more photos corresponding to a topmost region of the head, one or more photos corresponding to a back region of the head, one or more photos corresponding to a forehead region, one or more photos corresponding to a left side region of the head, and/or one or more photos corresponding to a right side region of the head. In other words, each of the plurality of head photos is corresponding to a head region, and the head region may be the topmost region of the head, the back region of the head, the forehead region, or the left side region of the head, or the right side region of the head. It should be noted here that a head photo corresponding to a head region means a photo that is obtained by photographing the head region.

In one embodiment, the acquisition module 3001 photographs the head of the user when the motor 37 drives the fan 38. In other embodiments, the acquisition module 3001 photographs the head of the user even when the motor 37 does not drive the fan 38.

At block S2, the execution module 3002 identifies a head region corresponding to each of the plurality of head photos.

In one embodiment, the execution module 3002 identifies the head region corresponding to each head photo using an image analysis algorithm such as a template matching method or a machine learning algorithm.

In one embodiment, the execution module 3002 may collect a preset number of photos corresponding to each head region as samples; train a head region recognition model based on the preset number of photos corresponding to each head region; thereby the execution module 3002 can recognize the head region corresponding to each photo by using the head region recognition model.

For example, the execution module 3002 may collect a preset number of photos corresponding to the back region of the head as samples; train a back region recognition model based on the samples. Thereby the execution module 3002 can recognize the back region of the head in a head photo which is corresponding to the back region of the head by using the back region recognition model.

At block S3, the execution module 3002 identifies related parameters of each head region based on the head photos corresponding to the each head region.

In one embodiment, the related parameters of each head region include hair color parameters. The hair color parameters include a hair color and a proportion of white hair.

In one embodiment, the identifying the hair color parameter of each head region includes (a1)-(a4):

(a1) Predefining a range of a red, a green, and a blue (RGB) value corresponding to each color.

(a2) Determining a color of each pixel of any one head photo corresponding to each head region according to the RGB value of each pixel of the any one head photo, and determining a proportion of each color included in the any one head photo according to a total number of pixels corresponding to each color in the any one head photo and a total number of all pixels included in the any one head photo.

For example, suppose that head photo A is corresponding to the topmost region of the head, the total number of pixels corresponding to black color in the head photo A is T1, and the total number of pixels included in photo A is T, then the proportion of black color included in photo A is T1/T.

(a3) Among the proportions of all the colors included in the any one head photo, setting the color corresponding to a largest proportion as the hair color corresponding to the any one head photo; and setting the proportion of white color in the any one head photo as the proportion of white hair corresponding to the any one head photo, thereby according to (a1)-(a3), the hair color and the proportion of white hair corresponding to each head photo corresponding to each head region are obtained.

For example, suppose that head photo A is corresponding to the topmost region of the head, and the proportion of black color included in photo A is 90%, the proportion of white color included in photo A is 5%, and the proportion of gray color included in photo A is 5%, then the largest proportion is 90%. Then the color corresponding to the largest proportion (i.e., black color) is set as the hair color corresponding to the photo A, and the proportion 5% of white color in the photo A is set as the proportion of white hair corresponding to the photo A.

(a4) Determining the hair color of the any one head region according to the hair color of each head photo corresponding to the any one head region; and determining the proportion of white hair in the any one head region according to the proportion of white hair in each head photo corresponding to the any one head region.

In an embodiment, the determining of the hair color of the any one head region includes:

Counting a frequency of each hair color corresponding to the any one head region based on the hair color corresponding to each of all head photos corresponding to the any one head region; and setting the hair color corresponding to a highest frequency as the hair color of the any one head region.

For example, suppose photo A, photo B, and photo C are corresponding to the topmost region of the head; at block (a3), it is determined that the hair color corresponding to photo A is black, the hair color corresponding to photo B is black, and the hair color corresponding to photo C is white, that is, the frequency of black is twice, and the frequency of white is 1, then the hair color corresponding to the topmost region of the head is determined as being black.

In an embodiment, the determining of the proportion of white hair in any one head region includes:

Sorting all the proportions of white hair of all head photos corresponding to the any one head region by size; setting the proportion of white hair with a middle size as the proportion of white hair of the any one head region.

For example, suppose that the topmost region of the head corresponds to three head photos, i.e., photo A, photo B, and photo C; the proportions of white hair in the three head photos are 5%, 15%, and 25% respectively, therefore, the proportion 15% is arranged in middle after the three proportions are sorted. Then the proportion (i.e., 15%) of white hair arranged in middle is set as the proportion of white hair in the topmost region of the head.

What needs to be said is that when there are two proportions of white hair are arranged in the middle, an average of the two proportions of white hair arranged in the middle is set as the proportion of white hair in the topmost region of the head.

For example, suppose that the topmost region of the head corresponds to four head photos, and the proportions of white hair corresponding to the four head photos are 5%, 15%, 25%, and 45% respectively, therefore, the proportions 15% and 25% are arranged in middle after the four proportions are sorted. Then the average value (i.e., 20%) of 15% and 25% is set as the proportion of white hair in the topmost region of the head.

In one embodiment, the related parameters of each head region further include scalp parameters. The scalp parameters include whether presence of dandruff is detected in the head region, whether the hair is oily, and a degree of redness and swelling of scalp.

In one embodiment, the identifying of whether there is dandruff in each head region and whether the hair is oily includes (b1)-(b6):

(b1) Predefining a value range of RBG value corresponding to a white pixel.

(b2) Determining white pixels in any one head photo corresponding to any one head region according to the RGB value of each pixel of the any one head photo.

(b3) Determining a connected area based on the white pixels in the any one head photo.

In this embodiment, the connected area refers to an area formed by the white pixels.

(b4) Counting a total number of white pixels corresponding to each connected area in the any one head photo.

(b5) Setting the connected area with the total number of white pixels less than a preset value (for example, 2) as a dandruff area (i.e., an area which is dandruff) in the any one head photo; and setting the connected area with the total number of white pixels greater than or equal to the preset value as an oily area (i.e., an area of which the hair is oily).

(b6) When there is at least one head photo including the dandruff area among all the head photos corresponding to any one head region, it is determined that the any one head region has dandruff; and when the any one head region has dandruff; and there is at least one head photo in all the head photos corresponding to the any one head region including the oily area, it is determined that the hair is oily in the any one head region.

In one embodiment, the identifying of the degree of redness and swelling of the scalp in each head region includes (c1)-(c4):

(c1) Predefining a value range of the RBG value corresponding to a red pixel.

(c2) Determining the red pixel in any one head photo corresponding to any one head region according to the RGB value of each pixel of the any one head photo.

(c3) Calculating a proportion of red pixels in the any one head photo based on a total number of red pixels in the any one head photo and a total number of all pixels included in the any one head photo.

For example, suppose that photo A is corresponding to the topmost region of the head, the total number of red pixels in photo A is T2, and the total number of pixels included in the photo A is T, then the proportion of the red pixels included in the photo A is T2/T.

(c4) Determining the degree of redness and swelling of the scalp in the any one head region according to the proportion of red pixels in each head photo of all head photos corresponding to the any one head region.

In this embodiment, the execution module 3002 sorts the proportions of red pixels in each of all head photos corresponding to the any one head region; and sets the proportion of red pixels with a middle size as the degree of redness and swelling of the scalp in the any one head region, i.e., sets the proportion of red pixels arranged in the middle as the degree of redness and swelling of the scalp in the any one head region.

For example, suppose that the topmost region of the head corresponds to three head photos, and the proportion of red pixels corresponding to the three head photos are 5%, 15%, and 25% respectively, therefore, the proportion 15% is arranged in the middle after the tree proportions are sorted. Then the proportion (i.e., 15%) arranged in the middle is set as the degree of redness and swelling of the scalp in the topmost region of the head.

What needs to be said is that when there are two proportions of red pixels arranged in the middle, the execution module 3002 can set an average value of the two proportions arranged in the middle as the degree of redness and swelling of the scalp in the topmost region of the head.

For example, suppose that the topmost region of the head corresponds to four head photos, and the proportions of red pixels corresponding to the four head photos are 5%, 15%, 25%, and 45% respectively, then an average value (i.e., 20%) of the two proportions (i.e., 15% and 25%) of red pixels arranged in the middle can be set as the degree of redness and swelling of the scalp in the topmost region of the head.

In one implementation, the related parameters of each head region further include hair quality parameter. The identifying the hair quality parameter of each head region includes (d1)-(d5):
  (d1) Converting all head photos corresponding to any one head region into grayscale images.
  (d2) Binarizing each grayscale image into a black-and-white image, thereby obtaining all black-and-white images corresponding to the any one head region.
  (d3) Counting a total number of black pixels in any one black-and-white image corresponding to the any one head region.
  (d4) Calculating a proportion of black pixels in any one black-and-white image based on the total number of black pixels in any one black-and-white image and a total number of all pixels in the any one black-and-white image, thereby obtaining the proportion of black pixels in each black-and-white image corresponding to the any one head region.
  (d5) Determining the hair quality parameter of the any one head region according to the proportion of black pixels of each black-and-white image corresponding to the any one head region.

In one embodiment, the execution module 3002 sorts the proportion of black pixels of each black-and-white image of all black-and-white images of the any one head region; and sets the proportion of black pixels arranged in a middle as the hair quality parameter of the any one head region.

For example, suppose that the topmost region of the head corresponds to three head photos, and the proportions of black pixels corresponding to the three head photos are 65%, 75%, and 95% respectively. Therefore, the proportion 75% is arranged in the middle after the three proportions are sorted. Then the proportion 75% is set as the hair quality parameter of the topmost region of the head.

What needs to be said is that when there two proportions of black pixels arranged in the middle, then an average value of the two proportions of black pixels arranged in the middle is set as the hair quality parameter of the topmost region of the head.

For example, suppose that the topmost region of the head corresponds to four head photos, and the proportions of red pixels corresponding to the four head photos are 65%, 75%, 95%, and 99% respectively, then an average value (i.e., 85%) of the two proportions (i.e., 75%, 95%) of black pixels arranged in the middle is set as the hair quality parameter of the topmost region of the head.

In an embodiment, the execution module 3002 also stores the related parameters of each head region and a current system time of the smart hair dryer 3 in the storage device 31.

In an embodiment, the execution module 3002 also sends the related parameters of each head region together with the current system time of the smart hair dryer 3 to an external device, such as a computer device.

At block S4, the execution module 3002 analyzes a condition of the scalp of each head region based on the related parameters of the each head region and historical related parameters corresponding to the each head region.

In an embodiment, the historical related parameters corresponding to each head region may be pre-stored in the storage device 31.

Specifically, the analyzing the condition of the scalp of each head region includes comparing each related parameter, and determining whether the scalp of each head region is abnormal according to a comparison result.

In one embodiment, when an analysis result indicates that the scalp of any one head region is abnormal, the execution module 3002 issues a corresponding prompt on the display screen 35 of the smart hair dryer 3 to warm the user that there is an abnormality in the scalp of the any one head region (for example, the prompt may be issued by displaying a text on the display screen 35).

For example, suppose that the hair quality parameter at the topmost region of the head corresponding to a time of Jan. 1, 2020 is 99%. If the current hair quality parameter is 75%, a difference between the current hair quality parameter and the historical hair quality parameter is greater than 20%, a prompt can be issued, for example, the display screen 35 shows a text indicating that the hair quality parameters decrease rapidly, and the scalp needs to be maintained.

The above description is only embodiments of the present disclosure, and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A scalp monitoring method applied to a smart hair dryer, the method comprising:
   obtaining a plurality of head photos by photographing a head of a user using a photographing device;
   identifying a head region corresponding to each of the plurality of head photos;
   identifying related parameters of each head region based on the head photos corresponding to the each head region, the related parameters of each head region comprising hair color parameters, and the hair color parameters comprising a hair color and a proportion of white hair, identifying the hair color parameters of each head region comprising: predefining a range of a red, a green, and a blue (RGB) value corresponding to each color; determining a color of each pixel of any one head photo corresponding to each head region according to the RGB value of each pixel of the any one head photo, and determining a proportion of each color comprised in the any one head photo according to a total number of pixels corresponding to each color in the any one head photo and a total number of all pixels comprised in the any one head photo; setting a color corresponding to a largest proportion as the hair color corresponding to the any one head photo; and setting the proportion of white color in the any one head photo as the proportion of white hair corresponding to the any one head photo, thereby the hair color and the proportion of white hair corresponding each head photo corresponding to each head region are obtained; and determining the hair color of the any one head region according to the hair color of each head photo corresponding to the any one head region; and determining the proportion of white hair in the any one head region according to the proportion of white hair in each head photo corresponding to the any one head region; and analyzing a condition of a scalp of the each head region based on the related parameters of the each head region.

2. The scalp monitoring method according to claim 1, further comprising:

issuing a prompt on a display screen of the smart hair dryer when an analysis result indicates that the scalp of any one head region is abnormal.

3. The scalp monitoring method according to claim 1, wherein determining the hair color of the any one head region comprises:

counting a frequency of each hair color corresponding to the any one head region based on the hair color corresponding to each of all head photos corresponding to the any one head region; and setting the hair color corresponding to a highest frequency as the hair color of the any one head region.

4. The scalp monitoring method according to claim 1, wherein the related parameters of each head region further comprise scalp parameters, which indicate whether there is dandruff in the head region, whether the hair is oily, and a degree of redness and swelling of scalp;

wherein identifying whether there is dandruff in each head region and whether the hair is oily comprises:

predefining a value range of RBG value corresponding to a white pixel;

determining white pixels in any one head photo corresponding to any one head region according to the RGB value of each pixel of the any one head photo;

determining a connected area based on the white pixels in the any one head photo;

counting a total number of white pixels corresponding to each connected area in the any one head photo;

setting the connected area with the total number of white pixels less than a preset value as a dandruff area in the any one head photo; and setting the connected area with the total number of white pixels greater than or equal to the preset value as an oily area;

when there is at least one head photo comprising the dandruff area among all the head photos corresponding to any one head region, determining that the any one head region has dandruff; and when the any one head region has dandruff, and at least one head photo in all the head photos corresponding to the any one head region comprising the oily area, determining that the hair is oily in the any one head region.

5. The scalp monitoring method according to claim 1, wherein the related parameters of each head region further comprise hair quality parameter, identifying the hair quality parameter of each head region comprises:

converting all head photos corresponding to any one head region into grayscale images;

binarizing each grayscale image into a black-and-white image, thereby obtaining all black-and-white images corresponding to the any one head region;

counting a total number of black pixels in any one black-and-white image corresponding to the any one head region;

calculating a proportion of black pixels in any one black-and-white image based on the total number of black pixels in any one black-and-white image and a total number of all pixels in the any one black-and-white image, thereby obtaining the proportion of black pixels in each black-and-white image corresponding to the any one head region; and determining the hair quality parameter of the any one head region according to the proportion of black pixels of each black-and-white image corresponding to the any one head region.

6. A smart hair dryer comprising:

a photographing device;

a storage device;

at least one processor; and the storage device storing one or more programs, which when executed by the at least one processor, cause the at least one processor to:

obtain a plurality of head photos by photographing a head of a user using the photographing device;

identify a head region corresponding to each of the plurality of head photos;

identify related parameters of each head region based on the head photos corresponding to the each head region, the related parameters of each head region comprising hair color parameters, and the hair color parameters comprising a hair color and a proportion of white hair, wherein the at least one processor identifies the hair color parameters of each head region by: predefining a range of a red, a green, and a blue (RGB) value corresponding to each color; determining a color of each pixel of any one head photo corresponding to each head region according to the RGB value of each pixel of the any one head photo, and determining a proportion of each color comprised in the any one head photo according to a total number of pixels corresponding to each color in the any one head photo and a total number of all pixels comprised in the any one head photo; setting a color corresponding to a largest proportion as the hair color corresponding to the any one head photo; and setting the proportion of white color in the any one head photo as the proportion of white hair corresponding to the any one head photo, thereby the hair color and the proportion of white hair corresponding each head photo corresponding to each head region are obtained; and determining the hair color of the any one head region according to the hair color of each head photo corresponding to the any one head region; and determining the proportion of white hair in the any one head region according to the proportion of white hair in each head photo corresponding to the any one head region; and analyze a condition of a scalp of the each head region based on the related parameters of the each head region.

7. The smart hair dryer according to claim 6, wherein the at least one processor is further caused to:

issue a prompt on a display screen of the smart hair dryer when an analysis result indicates that the scalp of any one head region is abnormal.

8. The smart hair dryer according to claim 6, wherein the determining the hair color of the any one head region comprises:

counting a frequency of each hair color corresponding to the any one head region based on the hair color corresponding to each of all head photos corresponding to the any one head region; and setting the hair color corresponding to a highest frequency as the hair color of the any one head region.

9. The smart hair dryer according to claim 6, wherein the related parameters of each head region further comprise scalp parameters, which indicate whether there is dandruff in the head region, whether the hair is oily, and a degree of redness and swelling of scalp;
   wherein the at least one processor is further caused to identify whether there is dandruff in each head region and whether the hair is oily, comprising:
   predefining a value range of RBG value corresponding to a white pixel;
   determining white pixels in any one head photo corresponding to any one head region according to the RGB value of each pixel of the any one head photo;
   determining a connected area based on the white pixels in the any one head photo;
   counting a total number of white pixels corresponding to each connected area in the any one head photo;
   setting the connected area with the total number of white pixels less than a preset value as a dandruff area in the any one head photo; and setting the connected area with the total number of white pixels greater than or equal to the preset value as an oily area;
   when there is at least one head photo comprising the dandruff area among all the head photos corresponding to any one head region, determining that the any one head region has dandruff; and when the any one head region has dandruff, and at least one head photo in all the head photos corresponding to the any one head region comprising the oily area, determining that the hair is oily in the any one head region.

10. The smart hair dryer according to claim 6, wherein the related parameters of each head region further comprise hair quality parameter;
    wherein the at least one processor is further caused to identify the hair quality parameter of each head region, comprising:
    converting all head photos corresponding to any one head region into grayscale images;
    binarizing each grayscale image into a black-and-white image, thereby obtaining all black-and-white images corresponding to the any one head region;
    counting a total number of black pixels in any one black-and-white image corresponding to the any one head region;
    calculating a proportion of black pixels in any one black-and-white image based on the total number of black pixels in any one black-and-white image and a total number of all pixels in the any one black-and-white image, thereby obtaining the proportion of black pixels in each black-and-white image corresponding to the any one head region; and
    determining the hair quality parameter of the any one head region according to the proportion of black pixels of each black-and-white image corresponding to the any one head region.

11. The smart hair dryer according to claim 6, wherein the photographing device is set at a position where an air nozzle on a housing of the smart hair dryer is located.

12. The smart hair dryer according to claim 11, wherein the photographing device is set on a three-axis stabilizer, and the three-axis stabilizer is housed in the housing of the smart hair dryer or is exposed on the housing of the smart hair dryer.

13. A non-transitory storage medium having instructions stored thereon, when the instructions are executed by a processor of a smart hair dryer, the processor is configured to perform a scalp monitoring method, wherein the method comprises:
    obtaining a plurality of head photos by photographing a head of a user using a photographing device;
    identifying a head region corresponding to each of the plurality of head photos;
    identifying related parameters of each head region based on the head photos corresponding to the each head region, the related parameters of each head region comprising hair color parameters, and the hair color parameters comprising a hair color and a proportion of white hair, identifying the hair color parameters of each head region comprising: predefining a range of a red, a green, and a blue (RGB) value corresponding to each color; determining a color of each pixel of any one head photo corresponding to each head region according to the RGB value of each pixel of the any one head photo, and determining a proportion of each color comprised in the any one head photo according to a total number of pixels corresponding to each color in the any one head photo and a total number of all pixels comprised in the any one head photo; setting a color corresponding to a largest proportion as the hair color corresponding to the any one head photo; and setting the proportion of white color in the any one head photo as the proportion of white hair corresponding to the any one head photo, thereby the hair color and the proportion of white hair corresponding each head photo corresponding to each head region are obtained; and determining the hair color of the any one head region according to the hair color of each head photo corresponding to the any one head region; and determining the proportion of white hair in the any one head region according to the proportion of white hair in each head photo corresponding to the any one head region; and
    analyzing a condition of a scalp of the each head region based on the related parameters of the each head region.

14. The non-transitory storage medium according to claim 13, wherein the method further comprising:
    issuing a prompt on a display screen of the smart hair dryer when an analysis result indicates that the scalp of any one head region is abnormal.

15. The non-transitory storage medium according to claim 13, wherein the determining the hair color of the any one head region comprises:
    counting a frequency of each hair color corresponding to the any one head region based on the hair color corresponding to each of all head photos corresponding to the any one head region; and
    setting the hair color corresponding to a highest frequency as the hair color of the any one head region.

16. The non-transitory storage medium according to claim 13, wherein the related parameters of each head region further comprise scalp parameters, which indicate whether there is dandruff in the head region, whether the hair is oily, and a degree of redness and swelling of scalp;
    wherein identifying whether there is dandruff in each head region and whether the hair is oily comprises:
    predefining a value range of RBG value corresponding to a white pixel;
    determining white pixels in any one head photo corresponding to any one head region according to the RGB value of each pixel of the any one head photo;
    determining a connected area based on the white pixels in the any one head photo;

counting a total number of white pixels corresponding to each connected area in the any one head photo;

setting the connected area with the total number of white pixels less than a preset value as a dandruff area in the any one head photo; and setting the connected area with the total number of white pixels greater than or equal to the preset value as an oily area;

when there is at least one head photo comprising the dandruff area among all the head photos corresponding to any one head region, determining that the any one head region has dandruff; and when the any one head region has dandruff, and at least one head photo in all the head photos corresponding to the any one head region comprising the oily area, determining that the hair is oily in the any one head region.

17. The non-transitory storage medium according to claim 13, wherein the related parameters of each head region further comprise hair quality parameter, the identifying the hair quality parameter of each head region comprises:

converting all head photos corresponding to any one head region into grayscale images;

binarizing each grayscale image into a black-and-white image, thereby obtaining all black-and-white images corresponding to the any one head region;

counting a total number of black pixels in any one black-and-white image corresponding to the any one head region;

calculating a proportion of black pixels in any one black-and-white image based on the total number of black pixels in any one black-and-white image and a total number of all pixels in the any one black-and-white image, thereby obtaining the proportion of black pixels in each black-and-white image corresponding to the any one head region; and determining the hair quality parameter of the any one head region according to the proportion of black pixels of each black-and-white image corresponding to the any one head region.

\* \* \* \* \*